United States Patent [19]

Kaneko

[11] Patent Number: 5,380,974
[45] Date of Patent: Jan. 10, 1995

[54] WIRE-CUT ELECTROEROSION APPARATUS

[75] Inventor: Yuji Kaneko, Sakai, Japan

[73] Assignee: Sodick Co., Ltd., Yokohama, Japan

[21] Appl. No.: 201,312

[22] Filed: Feb. 24, 1994

[30] Foreign Application Priority Data

Feb. 25, 1993 [JP] Japan .................. 5-060925

[51] Int. Cl.6 ............................. B23H 7/04
[52] U.S. Cl. .................. 219/69.12; 219/69.18
[58] Field of Search .......... 219/69.12, 69.13, 69.18

[56] References Cited

U.S. PATENT DOCUMENTS

| 4,347,425 | 8/1982 | Obara ...................... 219/69.13 |
| 5,304,288 | 4/1994 | De Beurs et al. ............. 219/69.12 |

FOREIGN PATENT DOCUMENTS

| 52-150896 | 12/1977 | Japan . | |
| 63-17569 | 4/1988 | Japan . | |
| 3-136719 | 6/1991 | Japan . | |
| 5-12087 | 2/1993 | Japan . | |
| 5-220618 | 8/1993 | Japan .................. 219/69.18 |
| 637224 | 12/1978 | U.S.S.R. ................. 219/69.13 |
| 92/14575 | 9/1992 | WIPO ................... 219/69.12 |

*Primary Examiner*—Geoffrey S. Evans
*Attorney, Agent, or Firm*—Marks & Murase

[57] ABSTRACT

A wire-cut electroerosion apparatus for machining a workpiece, using a wire electrode, comprising a current pickup for delivering current to the wire electrode and a power circuit for applying a reverse-polarity voltage across a machining gap through the current pickup with the workpiece being negatively poled and the wire electrode being positively poled to inhibit electrolytic effects on the workpiece. A sacrifice conductor, made of a material such as zinc, having a larger ionization tendency than that of the current pickup, is provided in the vicinity of the current pickup to thereby inhibit undesirable electrolytic effects on the current pickup.

15 Claims, 6 Drawing Sheets

WIRE-CUT ELECTROEROSION APPARATUS

FIELD OF THE INVENTION

The present invention relates to a wire-cut electroerosion machine. More specifically, the present invention relates to a wire-cut electroerosion apparatus for performing electric discharge machining ("EDM") on a workpiece using a travelling wire electrode in which a train of successive machining pulses is applied across a machining gap formed between the wire electrode and the workpiece through a pair of current pickups.

BACKGROUND OF THE INVENTION

In a wire-cut electric discharge machine, a train of successive voltage pulses is applied across a machining gap between a travelling wire electrode and a workpiece being machined to induce electric discharges across the machining gap, thereby resulting in the machining of the workpiece. The wire electrode is continuously transported through the gap during machining while a dielectric fluid, such as water having a resistivity maintained at a generally constant value of more than 10000 ohm-cm, is supplied to the gap.

In general, when machining a workpiece using the wire-cut EDM, voltage pulses are usually applied through a pair of electrically conductive current pickups across a regularly poled machining gap, i.e., one in which the wire electrode is negative and the workpiece is positive. The current pickup, which is typically made of a hard, highly conductive, wear-resistant metal, for example hard alloys, such as silver tungsten and tungsten carbide, is always in physical contact with the travelling wire electrode to deliver thereto machining current pulses having a period of, for example several $\mu$ sec. During machining, the travelling wire electrode rubs on the current pickup, thereby generating frictional heat, which may result in wire breakage or dull the leading edge of the machining current pulse. In order to cool the current pickup, a dielectric fluid, the temperature of which is maintained at a generally constant value, is usually supplied to it.

When voltage pulses are repeatedly applied across a regularly poled machining gap, i.e., one in which the wire electrode is negative and the workpiece is positive, having a water-based dielectric fluid in the gap, the dielectric fluid may become electrolyzed resulting in an electrolytic current flowing across the low-resistivity portion(s) of the gap. This may, in turn, result in the formation of an affected layer on the workpiece surface. Particularly when machining a workpiece made of a so-called super hard alloy, for example cemented alloys such as cemented tungsten carbide which is obtained by sintering fine tungsten carbide powders mixed with a small amount of cobalt binder, or other materials susceptible to electrolysis, the (cobalt) binder material, which has a relatively high electrolytic solubility, may even dissolve out of the workpiece.

In Japanese Patent Publication No. 63-17569, a power supply for a wire-cut EDM is disclosed which has a main power source for generating a discharge across the machining gap with the wire electrode being negatively poled and the workpiece being positively poled, i.e., of regular polarity, and an auxiliary power source for generating a discharge across the gap with the wire electrode being positively poled and the workpiece being negatively poled, i.e., of reverse polarity. In this apparatus, a voltage of reverse polarity from the auxiliary power source is first applied across the gap to initiate a discharge. After detecting the occurrence of a discharge, the voltage from the main power source, of regular polarity, is used to maintain the discharge while power from the auxiliary power source is interrupted. As a result, the undesirable effects of the electrolytic activity are decreased.

Figure 5:
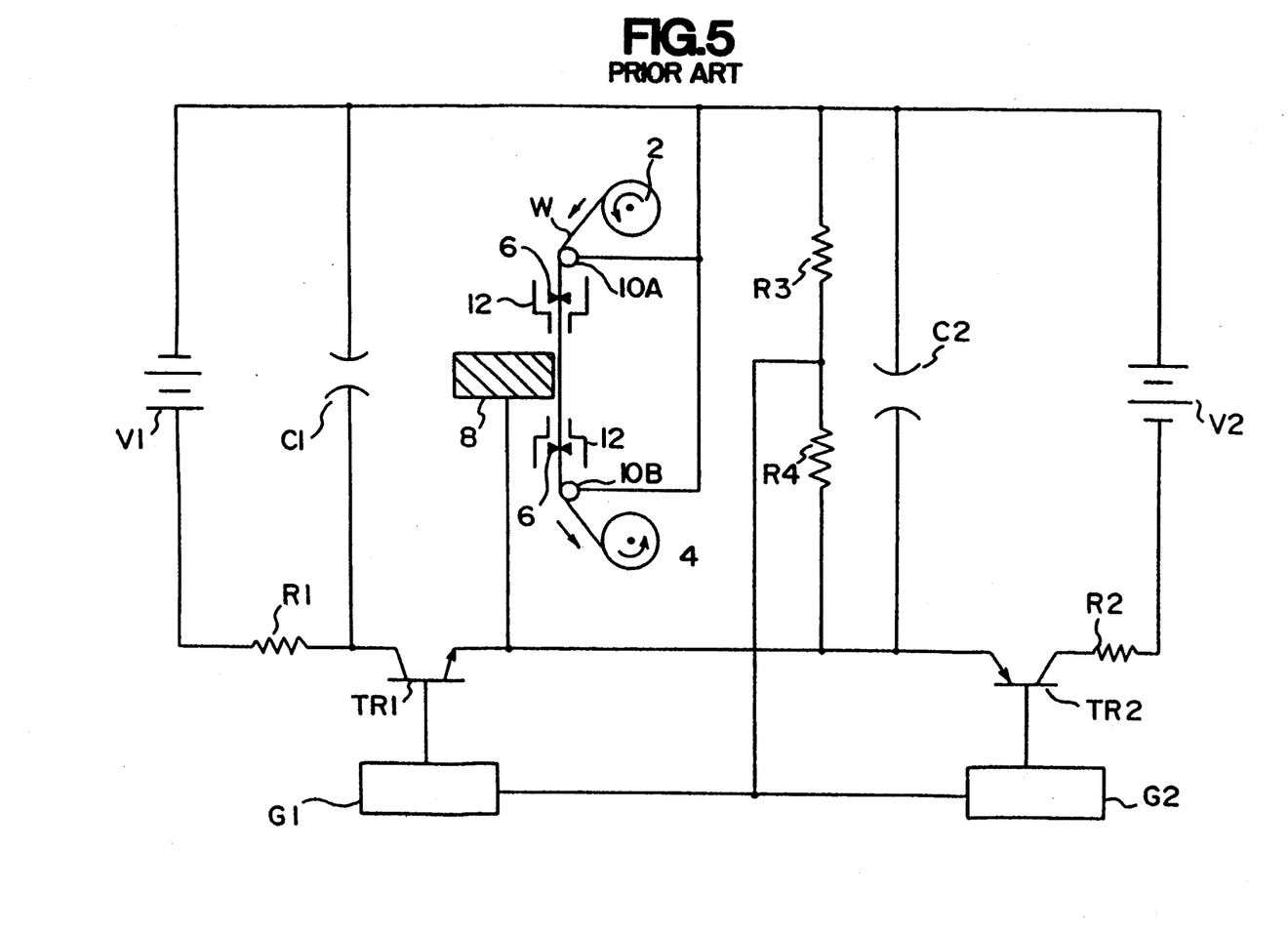
FIG. 5 is a block diagram illustrating a conventional power supply for wire-cut electroerosion apparatus.

FIG. 5 depicts a power supply illustrative of this prior art. The power supply comprises a power source V1 for delivering a high voltage at a large current, a power source V2 for delivering a low voltage at a small current, a large-capacity condenser C1, and a small-capacity condenser C2. The power supply further comprises transistors TR1 and TR2 for controlling current, flow pulse controllers G1 and G2, charging resistances R1 and R2 for the capacitors C1 and C2, respectively, and potential dividing resistances R3 and R4. A wire electrode W, unwound from a supply reel 2, is taken up by a take-up reel 4 while electric discharges are repeatedly induced between a workpiece 8 and the travelling wire electrode W to machine the workpiece 8. The wire electrode W is guided between wire guides 6. An upper current pickup 10A and a lower current pickup 10B, both of which are in physical contact with the travelling wire electrode W, deliver current to the travelling wire electrode W. Further, fluid guides 12 are used for guiding a dielectric fluid (not illustrated) to the machining gap formed between the wire electrode W and the workpiece 8.

Figure 6A:
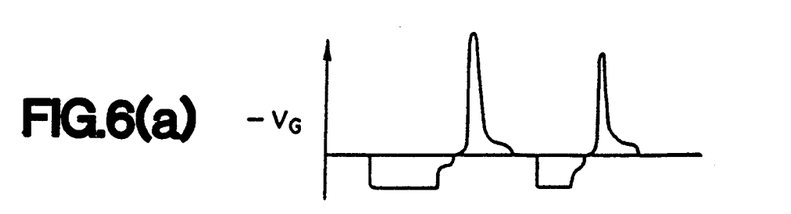
FIGS. 6(a) to 6(d) are timing charts illustrating the operation of the apparatus shown in FIG. 5.
Figure 6B:
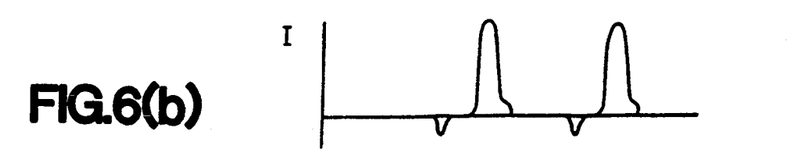
Figure 6C:
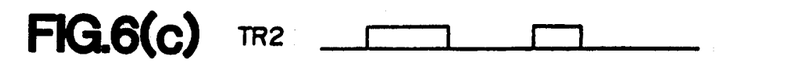
Figure 6D:
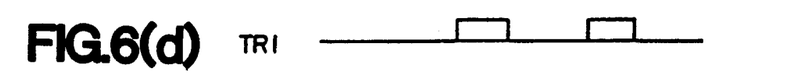

Operation of the apparatus shown in FIG. 5 will now be described with reference to FIGS. 6(a) to 6(d). FIGS. 6(a) and 6(b) are respectively illustrative of waveforms of the gap voltage, $-Vg$, developed in the machining gap, and the current I flowing across the machining gap. FIGS. 6(c) and 6(d), respectively, illustrate the ON/OFF timing of the transistors TR2 and TR1. As illustrated in FIG. 6(c), a voltage is first applied from the low-voltage power source V2 in reverse polarity, i.e., with the wire electrode W positively poled with respect to the workpiece 8, by turning on the transistor TR2 to initiate a discharge. Then, when the occurrence of a discharge is detected, the transistor TR1 is turned on, as illustrated in FIG. 6(d), to thereby apply a voltage across the machining gap from the high-voltage power source V1 in regular polarity, i.e., with the wire electrode W negatively poled with respect to the workpiece 8. This voltage maintains the discharge while the power from the low-voltage power source V2 is interrupted.

When machining with such a change in polarity of voltage pulses, electrolytic effects on the surface of a workpiece tend to be inhibited. However, in this case, as compared to machining using regular polarity voltage pulses only, the current pickups 10A and 10B may be subjected to electrolytic corrosion during reverse polarity operation since the dielectric fluid for cooling the current pickups may become locally electrolyzed. This electrolytic corrosion of current pickups may result in an increase in an electrical contact resistance and frictional resistance, which in turn may result in wire breakage. Therefore, the current pickups 10A and 10B will require frequent replacement in order to prevent wire breakage.

SUMMARY OF THE INVENTION

An object of the present invention is to provide a wire-cut electroerosion apparatus having a power supply equipped to inhibit electrolytic effects on the current pickups to thereby decrease the possibility of wire breakage and extend the effective life-time of the current pickups.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

A general aspect of the present invention is the provision of a wire-cut electroerosion apparatus for machining a workpiece, using a wire electrode, the wire electrode being spaced from the workpiece across a machining gap and comprising a current pickup for delivering electric current to the wire electrode, a first power circuit for applying a reverse-polarity voltage across the machining gap through the current pickup with the workpiece being negatively poled and the wire electrode being positively poled to inhibit electrolytic effects on the workpiece, a conductor provided in the vicinity of the current pickup and a second power circuit for applying a voltage across a spacing between the conductor and the current pickup with the conductor being positively poled and the current pickup being negatively poled.

The second power circuit applies the voltage across the spacing between the conductor and the current pickup during the time when the first power circuit applies the voltage across the machining gap to thereby inhibit electrolytic effects on the current pickup while sacrificing the conductor.

Preferably, the conductor is made of material, such as zinc, which has a larger ionization tendency than the material of which the current pickup is made.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE PREFERRED EMBODIMENTS

An embodiment of the invention is described hereinafter in detail with reference to the drawings.

Figure 1:
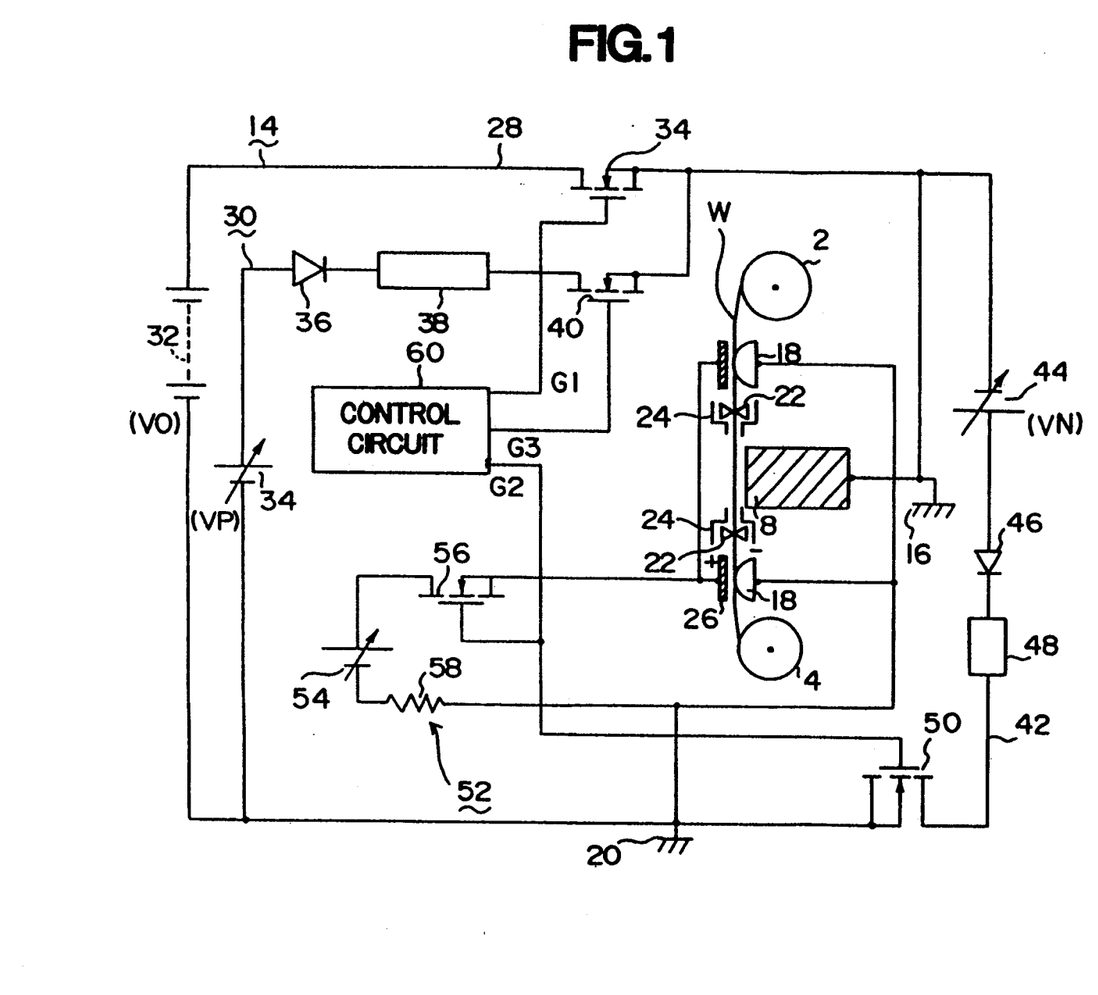
FIG. 1 is a block diagram illustrating an embodiment of the invention as used in a wire-cut electroerosion apparatus.

FIG. 1 shows a wire-cut electroerosion apparatus including an EDM power supply unit 14 for electric discharge machining. Electric energy for machining is supplied from the EDM power supply unit 14 to a machining gap G formed between a workpiece 8 and a wire electrode W. The workpiece 8 is connected to a first ground 16 while the wire electrode W is connected to a second ground 20 through a pair of current pickups 18. In the vicinity of each of the upper and lower current pickups 18, respective wire guides 22 for guiding the wire electrode W are provided, one on each side of the workpiece 8. The wire guides are preferably of the wire die or donut type. A pair of fluid guides 22 for delivering and guiding a water-based dielectric fluid (not illustrated) to the machining gap G are also provided. The wire electrode W is fed from a supply reel 2 and taken up by a take-up reel 4.

The mechanism for running the wire electrode W along a predetermined path, the mechanism for moving the wire electrode W relative to the workpiece 8 in a direction generally transverse to the axis of the wire electrode W in accordance with a desired contour to be cut, and a servo-control system for maintaining the proper size of the machining gap G during machining, are all well known and, in the interest of clarity and simplicity, have been omitted from FIG. 1.

In accordance with the present invention, a pair of conductors 26 are provided, one in close vicinity to each one of the pair of current pickups 18. Each of the conductors 26 are spaced from the wire electrode W and its respective current pickup 18 by a small spacing, whereby, in the manner described below, the conductors 26 are sacrificially subjected to electrolytic corrosion in place of the current pickups 18. For this purpose, it is preferable that the conductors 26 be made of a material, such as zinc, having a larger ionization tendency than the material from which the current pickups 18 are made.

The EDM power supply unit 14 includes a first circuit 28 for supplying main voltage pulses to the gap G with the workpiece 8 being positively poled and the wire electrode W being negatively poled; a second circuit 30 for supplying first auxiliary voltage pulses to the gap G with the workpiece 8 being positively poled and the wire electrode W being negatively poled; and a third circuit 42 for supplying second auxiliary voltage pulses to the gap G with the workpiece 8 being negatively poled and the wire electrode W being positively poled.

In the illustrated embodiment, the first circuit 28 includes an approximately 250-V high voltage, direct current power source 32 connected to the second ground 20 at its negative terminal, and a first switching transistor 34 provided between the positive terminal of the high-voltage, d.c. power source 32 and the workpiece 8. The second circuit 30 includes a variable, low-voltage, direct current power source 34, preferably adjustable between approximately 60 volts and 120 volts, which is connected to the second ground 20 at its negative terminal. The second circuit 30 further includes a diode 36 for reverse-current protection, a current limiting resistor 38 and a second switching transistor 40, all of which are connected in series between the positive terminal of the variable, low-voltage, d.c. power source 34 and the workpiece 8. The third circuit 42 includes a variable, low-voltage, direct current power source 44, preferably adjustable between approximately 60 volts and 120 volts, which is connected to the workpiece 8 at its negative terminal. The third circuit 42 further includes a diode 46 for reverse-current protection, a current limiting resistor 48 and a third switching transistor 50, all of which are connected in series between the positive terminal of the variable, low-voltage, d.c. power source 44 and the second ground 20. It should be appreciated that all voltage levels given are exemplary only and should not be construed to in any way limit the scope of the invention.

Additionally, an auxiliary power supply circuit 52 is provided for applying a voltage across the spacings formed between each one of the pair of conductors 26 and its respective current pickup 18, to thereby prevent electrolytic corrosion of the current pickups 18. The auxiliary power supply circuit 52 includes a variable, low-voltage, auxiliary power source 54, preferably adjustable between approximately 60 volts and 120 volts, which is connected to the conductors 26 through an auxiliary switching transistor 56 at its positive terminal. The negative terminal of the variable, low-voltage, auxiliary power source 54 is connected to the second ground 20 and the current pickups 18 through an auxiliary current limiting resistor 58. The variable, low-voltage, auxiliary power source 54 is so arranged that the potential of the conductors 26 can be adjusted to be higher than that of the current pickups 18.

Figure 2:
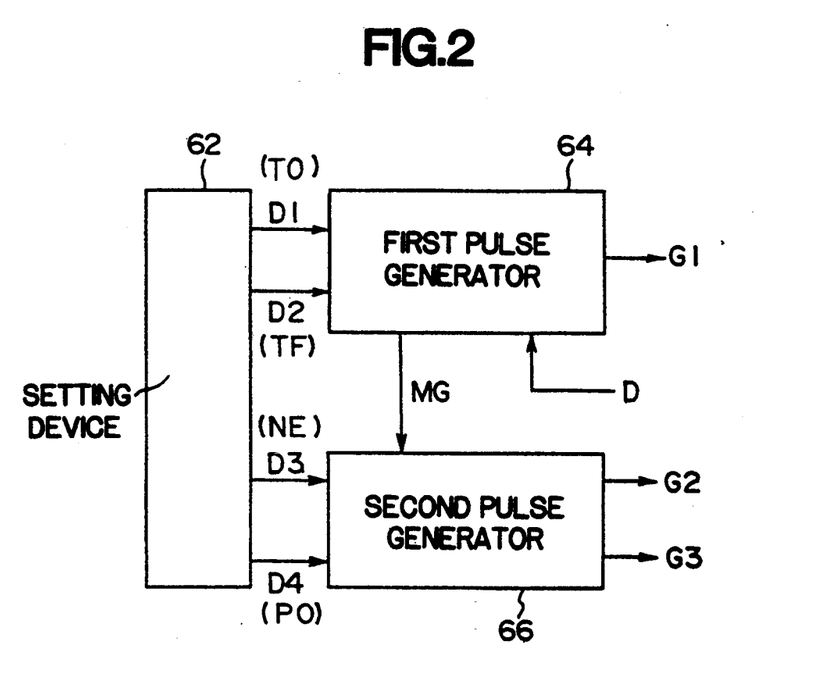
FIG. 2 is a block diagram of the control circuit of FIG. 1.

A control circuit 60 is provided for controlling the switching transistors 34, 40, 50 and 56. The control circuit 60 may include, for example, a microcomputer or the like. FIG. 2 is a block diagram showing an example of the control circuit 60. In the embodiment shown, the control circuit 60 comprises a setting device 62, a first pulse generator 64 and a second pulse generator 66. The setting device 62 includes the functions of setting and outputting a first setting data D1, representative of the ON-time TO, which corresponds to the time during which machining pulses are applied to the machining gap G, and a second setting data D2, representative of the OFF-time TF, which corresponds to the time during which no machining pulses are applied to the machining gap G. The setting device 62 further includes the function of setting and outputting a third setting data D3 and a fourth setting data D4 which respectively define the number NE, indicative of the number of reverse-polarity auxiliary voltage pulses to be generated in one cycle, and the number PO, indicative of regular-polarity auxiliary voltage pulses to be generated in one cycle.

Figures 3A, 3B:
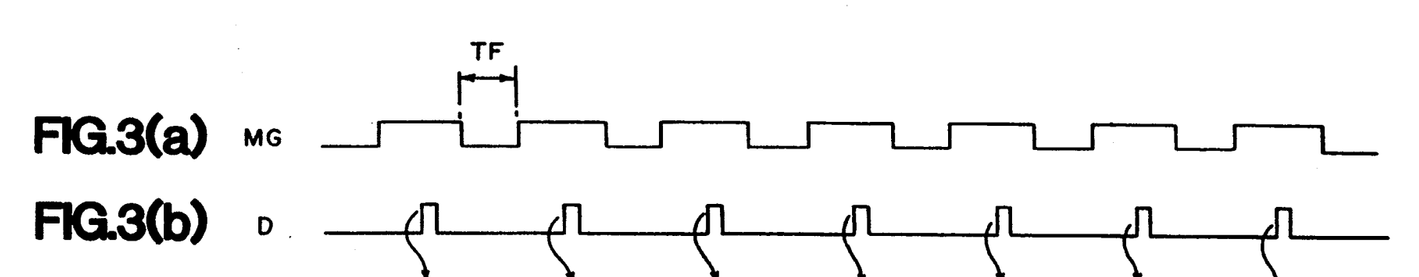
FIGS. 3(a) to 3(e) are timing charts illustrating the operation of the control circuit shown in FIG. 3.
Figure 3C:
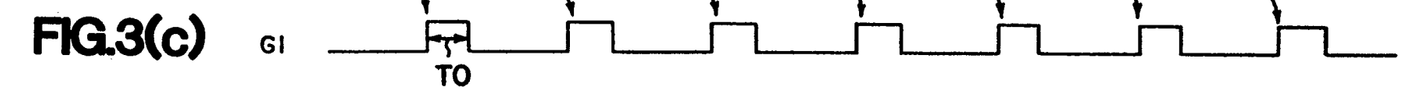

The first and second setting data D1 and D2 are input to the first pulse generator 64, which also receives a discharge detection signal D, representative of the occurrence of a discharge across the machining gap, from a conventional discharge detecting circuit (not illustrated) The first pulse generator 64 generates a main gate signal MG, shown in FIG. 3(a), which is input to the second pulse generator 66. In response to the main gate signal MG and the discharge detection signal D, shown in FIG. 3(b), the first pulse generator 64 further generates a first gate signal G1, shown in FIG. 3(c), having a pulse width duration TO, and which rises at the leading edge of the discharge detection signal D and falls at the trailing edge of the main gate signal MG. The first gate signal G1 is supplied as a pulse control signal to the gate of the first switching transistor 34. When the first gate signal G1 is high, i.e., during the ON-time TO defined by the first setting data D1, the first switching transistor 34 is in an ON condition.

Figure 3D:
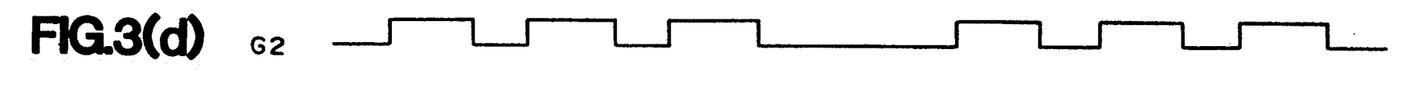
Figure 3E:
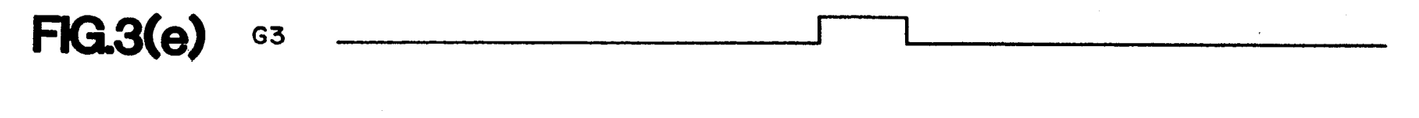

The second pulse generator 66 is formed as a pulse distributor, which selectively outputs either a second gate signal G2, which is a train of pulse(s) having ON/OFF times which generally correspond to the ON/OFF times of the main gate signal MG, or, in accordance with the third and fourth setting data D3 and D4, a third gate signal G3, which is a pulse or pulses having ON/OFF times which generally corresponds to the ON/OFF times of the main gate signal MG. This pulse distributing operation will be described with reference to waveforms shown in FIGS. 3(a), 3(d) and 3(e). The third setting data D3 represents the number of second gate signals G2 in one cycle of pulse distribution. With reference to the example of FIGS. 3(d) and 3(e), a cycle of pulse distribution would extend from the leading edge of the first of the train of second gate signals G2 to the leading edge of the first of the third gate signal G3. The fourth setting data D4 represents the number of third gate signals G3 in one cycle of pulse distribution. According to the third and fourth setting data D3 and D4, the main gate signals MG are distributed as second gate signals G2 and third gate signals G3, as shown in FIGS. 3(d) and 3(e). In the example illustrated, the number NE of the reverse-polarity auxiliary voltage pulses is set to the number "3" in accordance with the third setting data D3, and the number PO of the regular-polarity auxiliary voltage pulses is set to the number "1" in accordance with the fourth setting data D4. In other words, the distribution ratio is 3:1.

Referring back to FIG. 1, the second gate signal G2 is supplied as a pulse control gating signal to respective gates of the third switching transistor 50 and the auxiliary switching transistor 56. When the second gate signal G2 is high, the third switching transistor 50 and the auxiliary switching transistor 56 are in an ON condition. The third gate signal G3 is supplied to the gate of the second switching transistor 40 as a pulse control gating signal, the second switching transistor 40 being in an ON condition when the third gate signal G3 is high.

Referring now to waveforms in FIGS. 4(a) to 4(e), as will be appreciated by the artisan, either the third and auxiliary switching transistors 50 and 56 or the second switching transistor 40 is turned on prior to turning on the first switching transistor 34. The first switching transistor 34 is turned on when the discharge detection circuit (not illustrated) detects the occurrence of a discharge in the machining gap G and generates the discharge detection signal D.

Figure 4A:
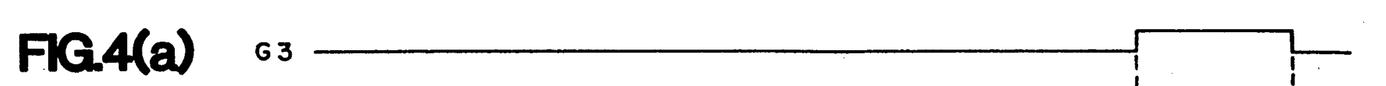
FIGS. 4(a) to 4(f) are timing charts illustrating the operation of the apparatus of FIG. 1.
Figure 4B:
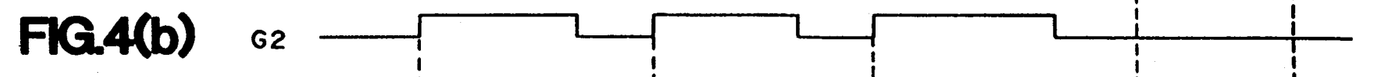
Figure 4C:
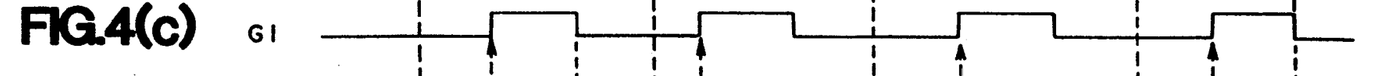
Figures 4D, 4E, 4F:
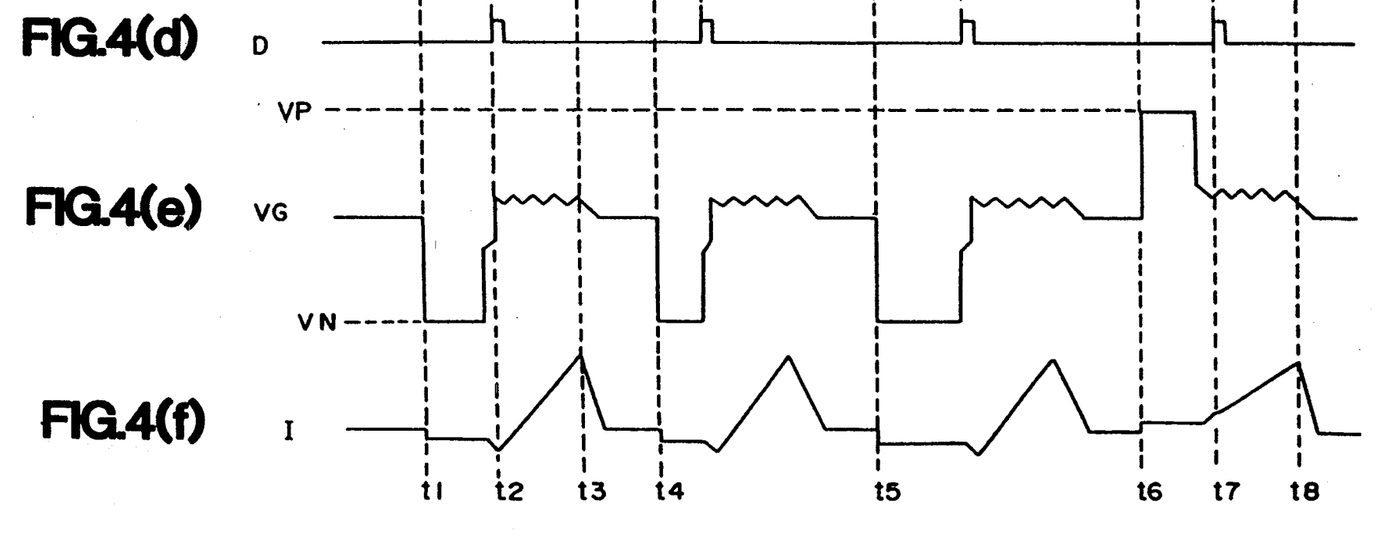

Operation of the apparatus shown in FIG. 1 will now be described with reference to FIG. 4. FIGS. 4(a), 4(b), 4(c) and 4(d) are illustrative of waveforms of the third gate signal G3, the second gate signal G2, the first gate signal G1 and the discharge detection signal D, respectively. FIG. 4(e) illustrates typical waveforms of a gap voltage VG, developed in the machining gap G, and FIG. 4(f) illustrates a waveform of a discharge current I flowing across the machining gap G.

At the time t1, prior to the occurrence of the first gate signal G1, when the second gate signal G2 goes high, the auxiliary and third switching transistors 56 and 50 are turned on. The variable, low-voltage, auxiliary power source 54 applies the voltage so that potential of the conductors 26 becomes higher than that of the current pickups 18, in other words, higher than that of the wire electrode W. At the same time, the variable, low-voltage, d.c. power source 44 applies the relatively low level, d.c. voltage, VN, across the machining gap G in so-called reverse polarity. Thereby, a discharge is caused to start in the machining gap G and at the time t2, when the discharge detection signal D goes high, the first gate signal G1 goes high and the high-voltage, d.c. power source 32 applies the even higher d.c. voltage, VO, across the machining gap G in the so-called regular polarity. Thereby, the workpiece 8 is machined by electric energy from the high-voltage, d.c. power source 32 until the time t3, when the main gate signal MG goes low. Although a discharge current flows from the wire electrode W through the gap G to the workpiece 8 at the start of a discharge, after the time t2, the discharge current I flows in the opposite direction, its level reaching a peak at time t3, and rapidly decreases after time t3, when the first gate signal G1 goes low.

In other words, first the reverse-polarity auxiliary voltage pulse is applied to the machining gap G through the third circuit 42, and once a discharge starts, the main voltage pulse is applied to the gap G through the first circuit 28 in the regular polarity. In the illustrated embodiment, the above-stated voltage applying operation is repeated by three times.

After that, at time t6, the third gate signal G3 goes high prior to the occurrence of the first gate signal G1 and the variable, low-voltage, d.c. power source 34 in the second circuit 30 applies the relatively low level, d.c. voltage, VP, across the machining gap G in the so-called regular polarity. Thereby, a discharge is caused to start in the machining gap G. At time t7, when the discharge detection signal D goes high, the first gate signal G1 goes high and the voltage VO from the high-voltage, d.c. power source 32 is applied across the gap G, still in the regular polarity. Therefore, electric energy for discharge machining is supplied to the gap G from both d.c. power supplies 32 and 34 at the same, i.e., regular, polarity. At time t8, when the first and second switching transistors 34 and 40 are both turned off, the level of discharge current I rapidly decreases and the discharge ends.

As will now be appreciated by the artisan, before the main voltage pulse of the regular polarity is applied across the machining gap G by means of the first circuit 28, one of two situations has occurred: either a reverse-polarity auxiliary voltage pulse has already been applied across the machining gap G by means of the third circuit 42, whereby during a discharge waiting period preceding a discharge, electrolytic activity is effectively inhibited, or, a regular-polarity auxiliary voltage pulse has already been applied across the gap G by means of the second circuit 30 during the discharge waiting period. The regular and reverse polarity auxiliary voltage pulses are supplied at a predetermined ratio, whereby priority is preferably given to improving machining rate over inhibiting electrolytic activity.

In other words, a ratio between the number NE, indicative of the number of reverse-polarity auxiliary voltage pulses to be generated in one cycle, and the number PO, indicative of regular-polarity auxiliary voltage pulses to be generated in one cycle of pulse distribution, can be set without sacrificing the machining rate in consideration of the resistance of a workpiece to electrolytic activity.

Additionally, as described above, when the second gate signal G2 is high and the auxiliary switching transistor 56 are in an ON condition, a voltage of, for example, 60 volts is applied across the spacing formed between each one of the pairs of conductors 26 and the wire electrode W by means of the variable, low-voltage, auxiliary power source 54 so that the potential of the conductors 26 is maintained at voltage higher than that of the current pickups 18. In this case, the potential of the conductors 26 is higher than that of the wire electrode W, which is higher than that of the workpiece 8. Therefore, electrolytic corrosion of the current pickups 18 is prevented, while sacrificing the conductors 26, thereby decreasing the possibility of a wire breakage. Additionally, the effective life-time of current pickups 18 is extended.

The foregoing description of a preferred embodiment of the invention has been presented for purposes of illustration and description. It is not intended to be exhaustive or to limit the invention to the precise form disclosed, and obviously many modifications and variations are possible in the light of the above teaching. For example, instead of using the conductor made of material, such as zinc, which has a larger ionization tendency than that of current pickup, the conductor made of material having a smaller ionization tendency may be used. It is intended that the scope of the invention be defined by the claims appended hereto.

I claim:

1. A power supply for a wire-cut electroerosion apparatus for machining a workpiece, said electroerosion apparatus including a wire electrode spaced from said workpiece and defining therewith a machining gap, said power supply comprising:

a current pickup for delivering current to said wire electrode;

a first power circuit for applying a first voltage across said machining gap through said current pickup with said workpiece being negatively poled and said wire electrode being positively poled;

a conductor provided in the vicinity of said current pickup; and a second power circuit for applying a second voltage across a spacing formed between said conductor and said current pickup with said conductor being positively poled and said current pickup being negatively poled.

2. The wire-cut electroerosion apparatus according to claim 1, further comprising control circuit for controlling said first and second power circuits whereby said second voltage is applied across said spacing during the time when said first power circuit applies said first voltage across said machining gap.

3. The wire-cut electroerosion apparatus according to claim 1, wherein the ionization tendency of said conductor is larger than that of said current pickup.

4. The wire-cut electroerosion apparatus according to claim 3, wherein said conductor is made of zinc.

5. The wire-cut electroerosion apparatus according to claim 2, wherein said first power circuit comprises a first dc power source and a first switch for controllably connecting said first dc power source and said workpiece, said first switch being responsive to a first output from said control circuit to apply said first voltage across said machining gap.

6. The wire-cut electroerosion apparatus according to claim 5, wherein said second power circuit further comprises a second dc power source and a second switch for controllably connecting said second dc power source and said conductor; said second switch being responsive to said first output from said control circuit to apply said second voltage across said spacing whereby, whenever said first output is at a high level, the conductor is maintained at a higher voltage potential than said current pickup.

7. The wire-cut electroerosion apparatus according to claim 1, wherein said power supply further comprises a third power circuit for applying a main voltage pulse across said machining gap through said current pickup, with said workpiece being positively poled with respect to said wire electrode.

8. The wire-cut electroerosion apparatus according to claim 7, wherein said power supply further comprises a fourth power circuit for supplying auxiliary voltage pulses across said machining gap, through said current pickup, with said workpiece being positively poled with respect to said wire electrode.

9. The wire-cut electroerosion apparatus according to claim 8, wherein said third power circuit includes a high voltage dc power source and a third switch for controllably connecting said high voltage dc power source and said workpiece, and wherein said fourth power circuit includes an auxiliary dc power source having a maximum voltage lower than that of said high voltage dc power source and a fourth switch for controllably connecting said dc power source to said workpiece, further comprising a control circuit, said third switch being responsive to a second output from said control circuit to apply said main voltage across said machining gap, and said fourth switch being responsive to a third output from said control circuit for applying said auxiliary voltage across said machining gap.

10. The wire-cut electroerosion apparatus according to claim 9, wherein said first power circuit includes a first and second switch for controllably connecting said first voltage across said machining gap and said second voltage across said spacing, respectively.

11. The wire-cut electroerosion apparatus according to claim 10, further comprising a control circuit for generating control signals for controlling said first, second, third and fourth switches.

12. The wire-cut electroerosion apparatus according to claim 11, wherein said control circuit comprises a first pulse generator for generating a first train of gating signals for controlling said third switch.

13. The wire-cut electroerosion apparatus according to claim 12, wherein said control circuit comprises a second pulse generator for selectively generating second and third gating signals in accordance with a predetermined ratio, said second gating signal being operable to control said first and second switches and said third gating signal being operable to control said fourth switch.

14. The wire-cut electroerosion apparatus according to claim 13, wherein said first pulse generator is responsive to on-time and off-time data whereby said first train of gating signals has preset on-time and off-time.

15. The wire-cut electroerosion apparatus according to claim 14, wherein said second and third gating signals each comprise a train of pulses collectively having one pulse for each pulse in said first gating signal, and wherein said second pulse generator is responsive to ratio data to distribute said pulse between said second and third gating signals.

* * * * *